United States Patent
Hanak et al.

(10) Patent No.: US 9,422,803 B2
(45) Date of Patent: Aug. 23, 2016

(54) PASSIVE MAGNETIC RANGING FOR SAGD AND RELIEF WELLS VIA A LINEARIZED TRAILING WINDOW KALMAN FILTER

(71) Applicants: Francis Chad Hanak, League City, TX (US); Robert A. Estes, Tomball, TX (US)

(72) Inventors: Francis Chad Hanak, League City, TX (US); Robert A. Estes, Tomball, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 928 days.

(21) Appl. No.: 13/666,646

(22) Filed: Nov. 1, 2012

(65) Prior Publication Data

US 2014/0121971 A1    May 1, 2014

(51) Int. Cl.
| | |
|---|---|
| E21B 47/022 | (2012.01) |
| E21B 47/024 | (2006.01) |
| E21B 47/09 | (2012.01) |
| G01V 3/08 | (2006.01) |
| G01V 3/38 | (2006.01) |
| G05B 15/00 | (2006.01) |
| G06F 17/40 | (2006.01) |
| G06F 19/00 | (2011.01) |
| G01V 3/26 | (2006.01) |

(52) U.S. Cl.
CPC ......... *E21B 47/02216* (2013.01); *E21B 47/022* (2013.01); *E21B 47/024* (2013.01); *E21B 47/0905* (2013.01); *E21B 47/09* (2013.01); *G01V 3/08* (2013.01); *G01V 3/26* (2013.01); *G01V 3/38* (2013.01); *G05B 15/00* (2013.01); *G06F 17/40* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 3,725,777 A | 4/1973 | Robinson et al. | |
| 4,372,398 A * | 2/1983 | Kuckes | E21B 47/02 166/66.5 |
| 5,103,920 A * | 4/1992 | Patton | E21B 47/02216 175/45 |
| 5,305,212 A | 4/1994 | Kuckes | |
| 5,512,830 A | 4/1996 | Kuckes | |
| 5,541,517 A | 7/1996 | Hartmann et al. | |
| 5,589,775 A | 12/1996 | Kuckes | |
| 5,675,488 A | 10/1997 | McElhinney | |
| 5,960,370 A | 9/1999 | Towle et al. | |
| 6,937,023 B2 | 8/2005 | McElhinney | |
| 7,617,049 B2 | 11/2009 | McElhinney et al. | |
| 7,816,923 B2 | 10/2010 | McElhinney | |
| 8,827,005 B2 * | 9/2014 | Morley | E21B 43/305 175/24 |

(Continued)

OTHER PUBLICATIONS

PCT International Search Report and Written Opinion; International Application No. PCT/US2013/066278; International Filing Date: Oct. 23, 2013; Date of Mailing Feb. 20, 2014; pp. 1-10.

*Primary Examiner* — Edward Cosimano
(74) *Attorney, Agent, or Firm* — Cantor Colburn LLP

(57) ABSTRACT

A method of drilling a well is disclosed. A first estimate is obtained of a location of the well with respect to a reference well at a selected depth. A magnetic measurement is obtained at the selected depth using a sensor. The obtained magnetic measurement is related to a residual magnetic charge distribution in the reference well. An expected value of the magnetic measurement at the selected depth is determined from the residual magnetic charge distribution. A second estimate is obtained of the location of the well using the first estimate of the location, the obtained magnetic measurement and the expected value of the magnetic measurement. A drilling parameter of the well is altered using the second estimate of the location.

18 Claims, 5 Drawing Sheets

(56) References Cited

U.S. PATENT DOCUMENTS

| | | |
|---|---|---|
| 2006/0131013 A1 | 6/2006 | McElhinney |
| 2007/0278008 A1 | 12/2007 | Kuckes et al. |
| 2009/0260878 A1* | 10/2009 | Morley ................ E21B 43/305 175/45 |
| 2009/0308657 A1 | 12/2009 | Clark et al. |
| 2011/0088890 A1 | 4/2011 | Clark |

* cited by examiner

PASSIVE MAGNETIC RANGING FOR SAGD AND RELIEF WELLS VIA A LINEARIZED TRAILING WINDOW KALMAN FILTER

BACKGROUND OF THE DISCLOSURE

1. Field of the Disclosure

The present disclosure relates to directional drilling and, in particular, to a method of determining a location of a well drilled with respect to a pre-existing reference well.

2. Description of the Related Art

Passive magnetic ranging arises out of the need to accurately determine the location of an existing well relative to a well being drilled. Relative position accuracy from survey-derived estimates is often insufficient due to the accumulation of measurement errors as the depth of the well increases. Passive magnetic ranging is a process for determining a relative position of a magnetic source in a reference well with respect to a magnetometer in a new well. A number of measurements and variables are used to determine the relative position. Exemplary measurements include, but are not limited to, measurement of the earth's magnetic field, orientation of the sensor, the strength and distribution of the source field (i.e., the residual magnetic fields in the reference well), sensor biases, scale factors, etc. These variables and measurements have uncertainties associated with them that make it difficult to determine relative position from a single magnetometer vector measurement. Thus, there is a need for improved methods for directional drilling of a well next to a reference well that account for all such error sources.

SUMMARY OF THE DISCLOSURE

In one aspect, the present disclosure provides a method of drilling a well, including: obtaining a first estimate of a location of the well with respect to a reference well at a selected depth; obtaining a magnetic measurement at the selected depth using a sensor, wherein the obtained magnetic measurement is related to a residual magnetic charge distribution in the reference well; determining an expected value of the magnetic measurement at the selected depth from the residual magnetic charge distribution; obtaining a second estimate of the location of the well using the first estimate of the location, the obtained magnetic measurement and the expected value of the magnetic measurement; and altering a drilling parameter of the well using the second estimate of the location.

In another aspect, the present disclosure provides a system for drilling a well proximate a reference well, the system includes a drill string configured to drill the well; a sensor disposed on the drill string configured to measure a downhole magnetic field; and a processor configured to: obtain a first estimate of a location of the well with respect to a reference well at a selected depth of the sensor, obtain from the sensor a magnetic measurement at the selected depth related to a residual magnetic charge distribution in the reference well, determine an expected value of the magnetic measurement at the selected depth from the residual magnetic charge distribution, obtain a second estimate of the location of the well using the first estimate of the location, the obtained magnetic measurement and the expected value of the magnetic measurement, and alter a drilling parameter of the well using the second estimate of the location.

In yet another aspect, the present disclosure provides a computer readable medium having stored thereon instructions that when read by at least one processor enable the at least one processor to perform a method of drilling a well, the method including: obtaining a magnetic measurement from a sensor at a selected depth, wherein the obtained magnetic measurement is related to a residual magnetic charge distribution in the reference well, determining an expected value of the magnetic measurement at the selected depth from the residual magnetic charge distribution, obtaining a second estimate of the location of the well using the first estimate of the location, the obtained magnetic measurement and the expected value of the magnetic measurement, and altering a drilling parameter of the well using the second estimate of the location.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS a1

For detailed understanding of the present disclosure, references should be made to the following detailed description of the exemplary embodiment, taken in conjunction with the accompanying drawings, in which like elements have been given like numerals and wherein.

DETAILED DESCRIPTION OF THE DISCLOSURE

Figure 1:
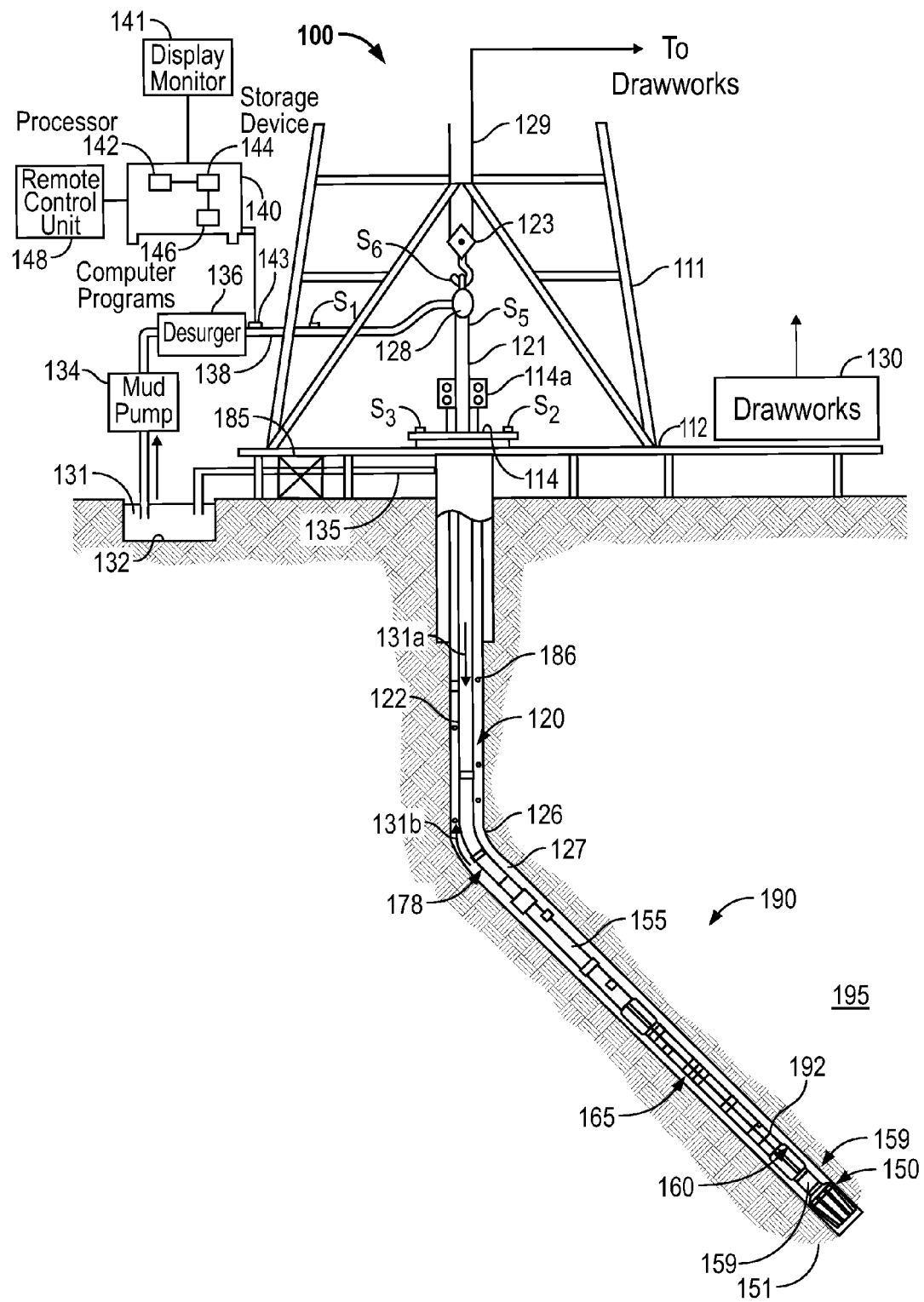
FIG. 1 is a schematic diagram of an exemplary drilling system that includes a drill string having a drilling assembly attached to its bottom end that includes a steering unit according to one embodiment of the disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottom-hole assembly ("BHA") 190 conveyed in a borehole 126, also referred to herein as a well or wellbore. The drilling system 100 includes a conventional derrick 111 erected on a platform or floor 112 which supports a rotary table 114 that is rotated by a prime mover 114a, such as an electric motor, at a desired rotational speed. A tubing (such as jointed drill pipe) 122, having the drilling assembly 190 attached at its bottom end extends from the surface to the bottom 151 of the borehole 126. A drill bit 150, attached to drilling assembly 190, disintegrates the geological formations when it is rotated to drill the borehole 126. The drill string 120 is coupled to a draw-works 130 via a Kelly joint 121, swivel 128 and line 129 through a pulley 123. Draw-works 130 is operated to control the weight on bit ("WOB"). The drill string 120 may be rotated by a top drive (not shown) instead of by the prime mover 114a and the rotary table 114. The operation of the draw-works 130 is known in the art and is thus not described in detail herein.

In one aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole and may control one or more operations of the downhole and surface devices.

The drilling assembly 190 also contain formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such sensors are generally known in the art and for convenience are generally denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

The drilling assembly may further include a magnetometer 192 for determining a local magnetic field. The magnetometer 192 may be a three-axis magnetometer for obtaining magnetometer measurements along three orthogonal directions. In an exemplary embodiment, one of the orthogonal directions (i.e., the z-direction) is directed along a longitudinal axis of the drill string and the other orthogonal directions (i.e., the x-direction and y-direction) are in a transverse plane of the drill string and extending radially outward from the drill string. The magnetometer 192 may measure the local magnetic field to obtain a measurement affected by the presence of the residual magnetic charge on a casing in a nearby reference well. These measurements may be sent to a processor that uses the measurements to determine a relative distance to the reference well. The drilling assembly may further include survey instruments for obtaining survey parameters, such as borehole inclination and azimuth. In one embodiment, the magnetometer 192 is located proximate a drill bit 150, thereby improving the relevancy of obtained measurements to the drill bit location and therefore the accuracy of the drill bit location. The estimated relative distance may be related to a sensor, a BHA, a drill bit or other suitable location of the drill string.

Still referring to FIG. 1, the drill string 120 further includes energy conversion devices 160 and 178. In an aspect, the energy conversion device 160 is located in the BHA 190 to provide an electrical power or energy, such as current, to sensors 165 and/or communication devices 159. Energy conversion device 178 is located in the drill string 120 tubular, wherein the device provides current to distributed sensors located on the tubular. As depicted, the energy conversion devices 160 and 178 convert or harvest energy from pressure waves of drilling mud which are received by and flow through the drill string 120 and BHA 190. Thus, the energy conversion devices 160 and 178 utilize an active material to directly convert the received pressure waves into electrical energy. As depicted, the pressure pulses are generated at the surface by a modulator, such as a telemetry communication modulator, and/or as a result of drilling activity and maintenance. Accordingly, the energy conversion devices 160 and 178 provide a direct and continuous source of electrical energy to a plurality of locations downhole without power storage (battery) or an electrical connection to the surface.

Figure 2:
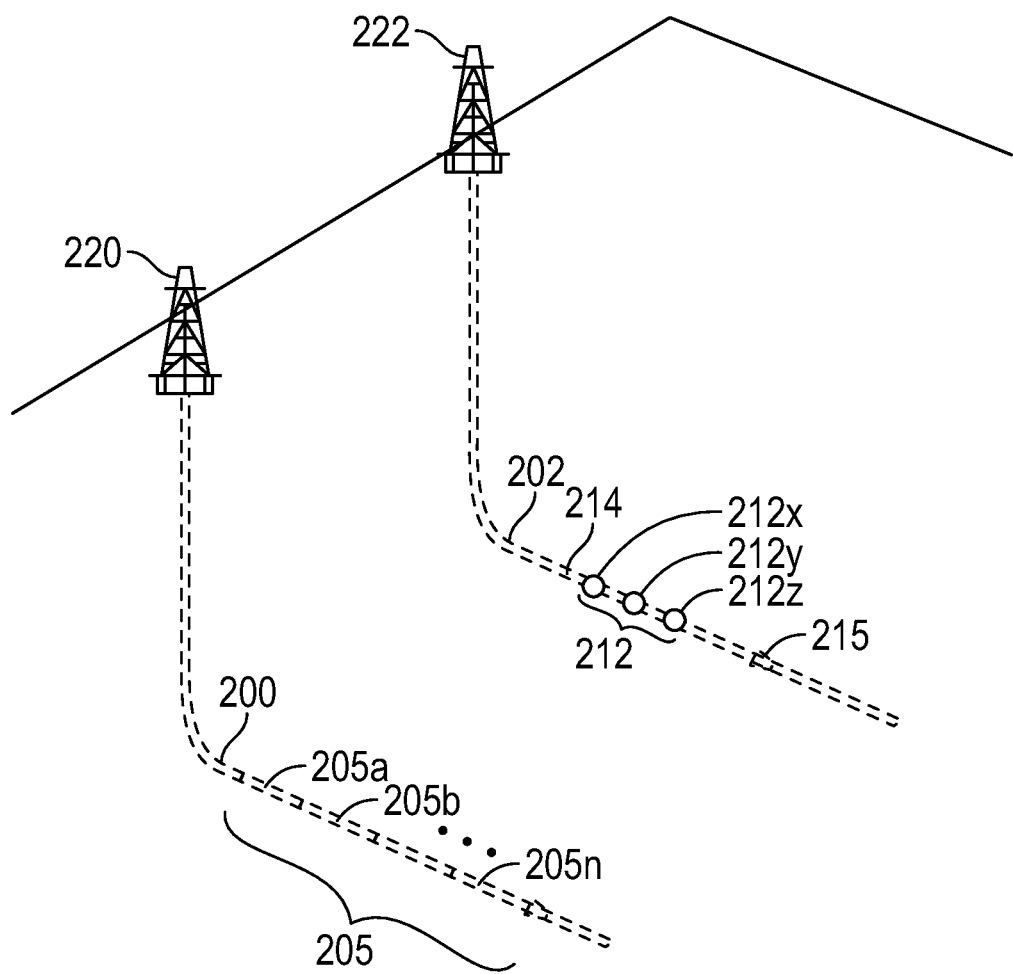
FIG. 2 shows a reference wellbore and a new wellbore being drilled alongside the reference wellbore at a location laterally displaced from the reference wellbore.

FIG. 2 shows a target borehole 200 (also referred to herein as a "reference borehole") and a new borehole 202 being drilled alongside the reference borehole 200 at a location laterally displaced from the reference borehole 200. In FIG. 2, the two boreholes 200 and 202 are shown as being drilled from two separate rigs 220 and 222, respectively, but they may also be drilled using the same rig. The reference borehole 200 includes a casing 205 therein that may include one or more casing tubulars 205a, . . . , 205n coupled end-to-end to each other. In various embodiments, the casing tubulars 205a, . . . , 205n have a residual magnetic charge on their surface. Typically, the residual magnetic charge results from an integrity check of the tubular casings 205a, . . . , 205n performed uphole prior to inserting the casing tubulars in the reference borehole 200. The magnetic inspection process generally involves imparting a strong magnetic charge to the casing and using the resulting magnetic field to observe imperfections. Once the tubular has been inspected, the tubular is demagnetized. Due to imperfections in the demagnetization process, a residual magnetic charge remains on the tubular. In various embodiments, the residual charge is measured at the uphole location and the measurements are stored in a memory location such as storage device 144. Once the tubular casing is installed in the reference borehole 200, the order of the tubular casings 205a, . . . , 205n and their locations in the reference borehole 200 is also stored in the memory location. Thus, a magnetic profile of the casing 205 may be obtained. The magnetic profile may be stored at a memory location and then used to perform the exemplary methods of the present disclosure to determine a relative location and/or orientation between new borehole 202 and reference borehole 200. The magnetic charge concentrations along the cased reference borehole 200 distort the Earth field in the proximity of the casing, usually by a few hundred nanoTesla (nT) at 5 meters distance. In comparison, the Earth's magnetic field is approximately 50,000 nT.

Exemplary new borehole 202 contains a drill string 214 having one or more sensors, such as a magnetometer 212 and survey instruments. The magnetometer 212 may include various single axis magnetometers $212x$, $212y$ and $212z$ aligned along orthogonal directions of a coordination system of the drill string 214. An exemplary coordinate system includes axes X, Y and Z, wherein the Z direction is along the longitudinal axis of the drill string 214 and X and Y directions are in a plane transverse to the longitudinal axis of the drill string 214. The axial locations of transmitter and receiver coils in the magnetic induction tool 202 are not limited to a particular configuration. The magnetometers $212x$, $212y$ and $212z$ detect the distortion in the earth's magnetic field due to the presence of the residual magnetic charge of the casing 205 in the reference borehole 200. A processor 215 may be coupled to the magnetometer 212 to determine relative location and/or orientation or the magnetometer 212 with respect to the reference borehole 200 using the measured magnetic fields. In various aspects, the determined location and/or orientation may then be used to drill the well 202 at a selected relation to the reference borehole 200 such as parallel to the reference borehole 200.

In another embodiment, the residual magnetic charge distribution from the plurality of casings may be measured prior to insertion into the target well, and an average charge distribution determined. Based on an arc of downhole measurements of the magnetic field performed by the magnetometer 212 in the new borehole 202, a processor may calculate an estimated charge distribution at the casing 205 that produces the downhole measurements. Parameters calculated from this estimated charge distribution may then be compared to corresponding parameters calculated from the average charge distribution to determine the measured depth offset and forward/backward orientation of the pieces of casing 205 in the target well 200 that are in the vicinity of the magnetometer 212. This casing identification result may be used in conjunction with the average charge distribution to aid in determining a location and orientation of the new borehole 202.

Figure 3:
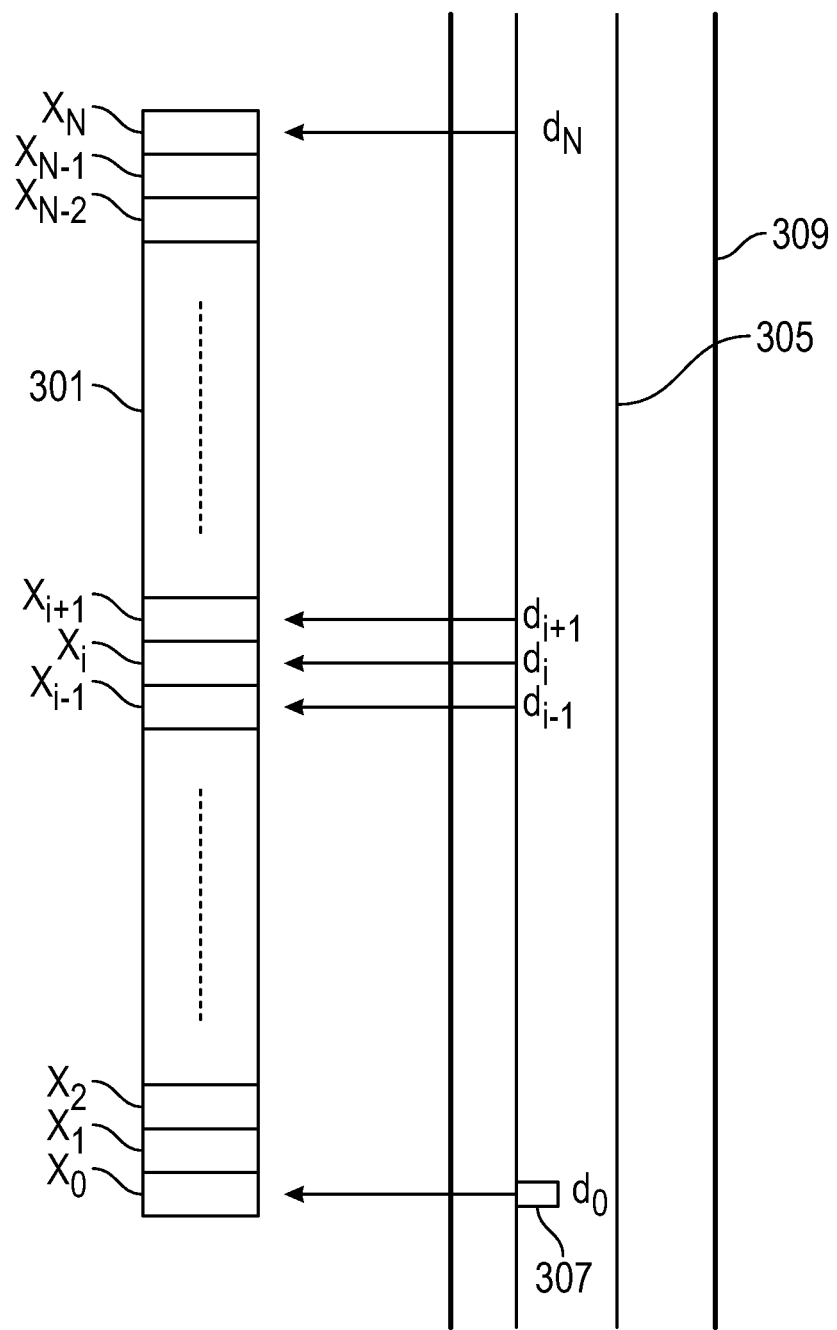
FIG. 3 shows an exemplary array suitable for use in determining a wellbore location using the methods disclosed herein.

FIG. 3 shows an exemplary array 301 suitable for use in determining a wellbore location using the methods disclosed herein. The array 301 includes a number of array locations $X_0$-$X_N$ that store data obtained at given depths, wherein the stored data is related to determining a relative position of the well with respect to the reference well at the given depths. In an exemplary embodiment, the data array may hold enough measurements to cover a span of 60 meters of depth, with measurements being obtained every 0.5 meters. However, the array may be selected to span any selected depth intervals and the interval between adjacent depths may be any selected distance or variable. The array 301 is shown in relation to exemplary drill string 305 having a sensor 307 thereon. In an exemplary embodiment, as the drill string 305 moves downward into the borehole 309, the sensor obtains measurement at selected locations. The obtained measurements are stored at the first array location ($X_0$) of the array. Any data that has been previously stored in the first array location $X_0$ is moved to the second array location ($X_1$) and data that has been previously stored in the second array location ($X_1$) is moved to the third array location ($X_2$), and so on. Data stored in the last array location ($X_N$) is removed from the array, but not before updating location information for array location $X_{N-1}$ using methods disclosed herein. Thus, in the exemplary configuration of FIG. 3, array location $X_0$ corresponds to data obtained at depth $d_0$, array location $X_1$ corresponds to data obtained at depth $d_1$, etc.

In one embodiment, the data stored in the array is used to determine a location and/or orientation of the sensor 307 with respect to the reference well. Data stored at array location $X_N$ includes an estimate of the sensor location and/or orientation relative to the reference well when it was at depth $d_N$. This estimate of relative location and/or orientation is used along with other data stored an array location $X_N$ to determine a relative location and/or orientation corresponding to depth $d_{N-1}$. This estimated relative location and/or orientation corresponding to $d_{N-1}$ is used along with data stored at array location $X_{N-1}$ to determine an estimated relative location and/or orientation corresponding to depth $d_{N-2}$, and so on until a relative location and/or orientation is estimated for the sensor at depth $d_0$. In various embodiments, determining a relative location and/or orientation at depth $d_i$ from an adjacent depth $d_{i+1}$ further includes utilizing a Kalman filter or suitable estimation process. The process of determining the location and/or orientation at the selected depth ($d_0$) using the data stored at depths $d_1$ through $d_N$ using the iterative process described above may be referred to as a filtering process.

In another aspect, a trailing filter is performed at array location $X_N$ to provide a nominal location and/or orientation estimate for the depth $d_{N-1}$ corresponding to array location $X_{N-1}$. This information is stored in array location $X_{N-1}$ prior to adding a new measurement at a subsequent depth that forces the $X_N$ data off of the array. Thus, the $X_N$ array location always includes an updated nominal location and/or orientation that can be used to determine location and/or orientation at the most recent depth measurement using the filtering process disclosed above. In addition, the trailing filter may be used to determined additional downhole parameters, including components of the background magnetic field, strength and location of a charge concentration on the casing, biases in build rate and/or turn rate, etc.

In various embodiments, the data stored at a given array location $X_i$ includes, for example, a measured depth $d_i$, survey data obtained at depth $d_i$, magnetic measurements at depth $d_i$, drilling rate, a build rate or turn rate and any additional measurements that may be used to determine a relative well location at array location $X_{i-1}$ corresponding to depth $d_{i-1}$. Associated uncertainties and covariances of the measurements, as well as of relative position and orientation, corresponding to depth $d_i$ may further be stored at array location $X_i$. Exemplary additional measurements may be stored in a separate data file and may include, for example, survey measurements from the reference well, residual magnetic profiles on the tubular casings in the reference well, locations of the tubular casings in the reference well, casing length, gravity reading from the reference well, etc.

In one embodiment, the magnetometer measurements are processed to obtain rotationally invariant magnetic fields in the well. The rotationally invariant magnetic fields may include total magnetic field ($B_T$), magnetic field magnitude in the x-y plane ($B_{xy}$) and the z-axis magnetic field ($B_z$). These rotationally invariant magnetic fields are used in determining relative well location and/or orientation. The rotationally invariant magnetic field measurements may be obtained during drilling of the well, i.e., during rotation of the drill string. In one embodiment, a plurality of measurements of the magnetic field are obtained over a time interval and averaged to obtain an average of the measurements. Therefore, average measurements are obtained for $B_T$, $B_{xy}$ and $B_z$. In various embodiments, the time interval is about 1 second and average measurements are obtained for some or all of $B_T$, $B_{xy}$ and $B_z$ using measurements obtained during the 1 second time interval. In one embodiment, rotationally invariant magnetic field measurements are obtained at a plurality of locations as the magnetometer moves through the well.

Figure 4:
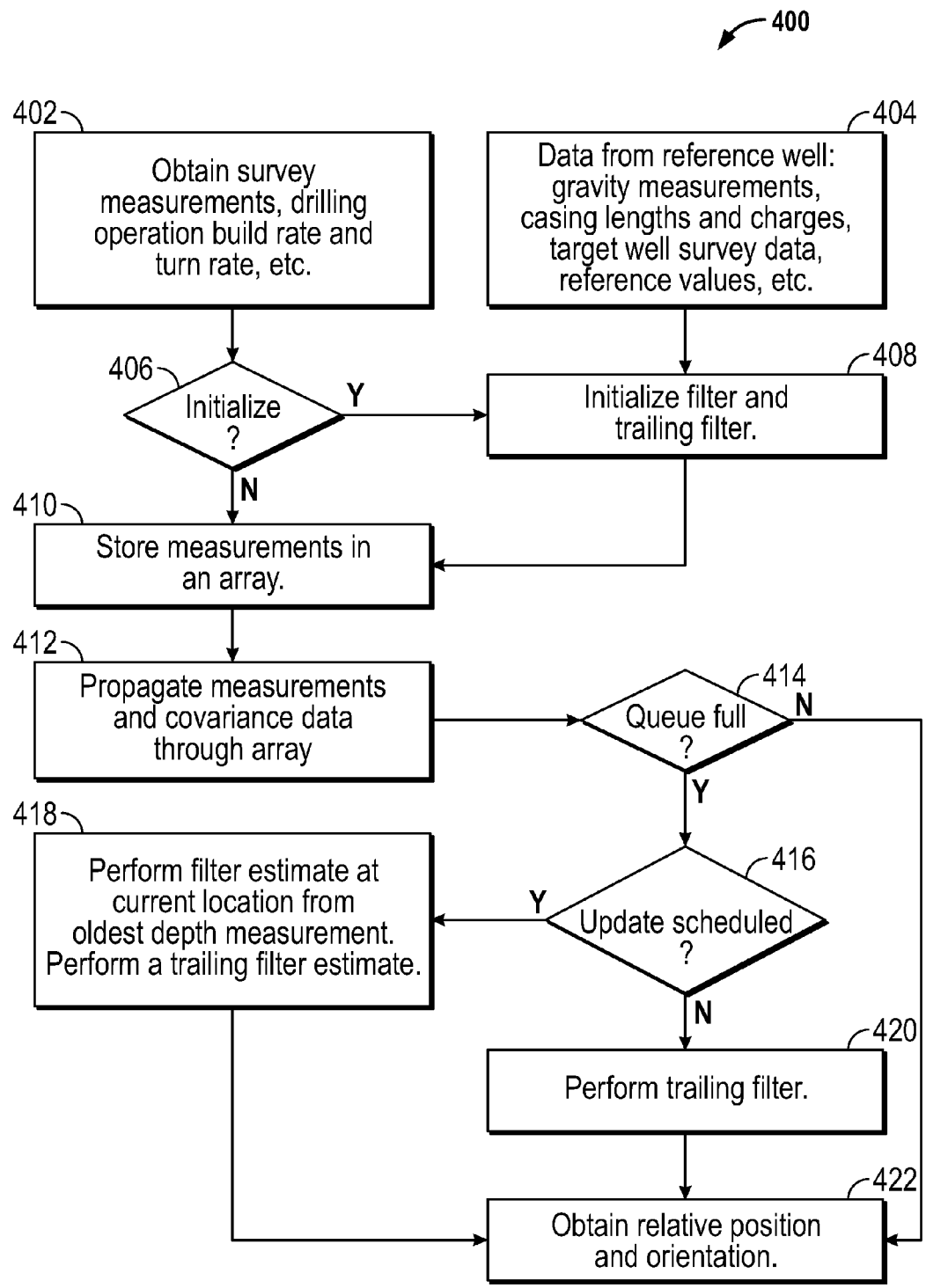
FIG. 4 shows a flowchart of an exemplary method of drilling a well with respect to a reference well.

FIG. 4 shows a flowchart 400 of an exemplary method of drilling a well with respect to a reference well. In block 402, real-time parameters from the well being drilled are input, including measured depth, build and turn rate, measurements of the magnetic field and gravity vector from downhole, etc. In block 404, data from the reference well is stored. This data may include, for example, gravity measurements from the reference well, casing lengths and casing magnetic charge distributions on the casing tubulars, survey measurements obtained from the reference well and other reference values as such as the total Earth magnetic field strength, dip angle, etc. In block 406, a determination is made of whether initialization is required. When initialization is required, the block 408 initializes the filter and the trailing filter using the reference well data. If either no initialization is required or once the filter and trailing filter have been initialized, the method proceeds to block 410.

In block 410, measurement data is stored in an array. As disclosed above, each array location corresponds to a selected depth of the new well, and the data or measurements at a selected location are obtained at the selected depth. These measurements include, for example, survey measurements (i.e., magnetic measurements), and build rate and turn rate data. In an exemplary embodiment, the build rate and turn rate data is converted into a local frame of reference of the BHA and assigned to a measured depth prior to being stored at the array location. The measured depth may be adjusted using survey measurement values.

In block 412, the measurement and covariance data are propagated to the measured depth of the most current measurement. However, the filter for performing location and orientation determination may not be exercised at this time. In block 414 a determination is made whether the array is full or not. If the array is not full, a relative position and orientation may be output in box 422. If the array is full, then the method proceeds to block 416. In block 416, a check is made whether an update (i.e., a determination of location and/or orientation at $d_0$) is scheduled. If an update is scheduled, the iterative filter and the trailing filter discussed above are exercised in block 418. The iterative filter may use as an initial estimate at depth $d_N$, location and orientation data obtained using the trailing filter. The iterative filter may also be used to determine various downhole parameters, including components of the background magnetic field, strength and location of the charge concentration on the casing, biases in build rate and/or turn rate, etc. Returning to block 416, if no update is scheduled, performing the trailing filter (block 420) may only be exercised so that the data stored at the last array location is continuously updated.

Figure 5:
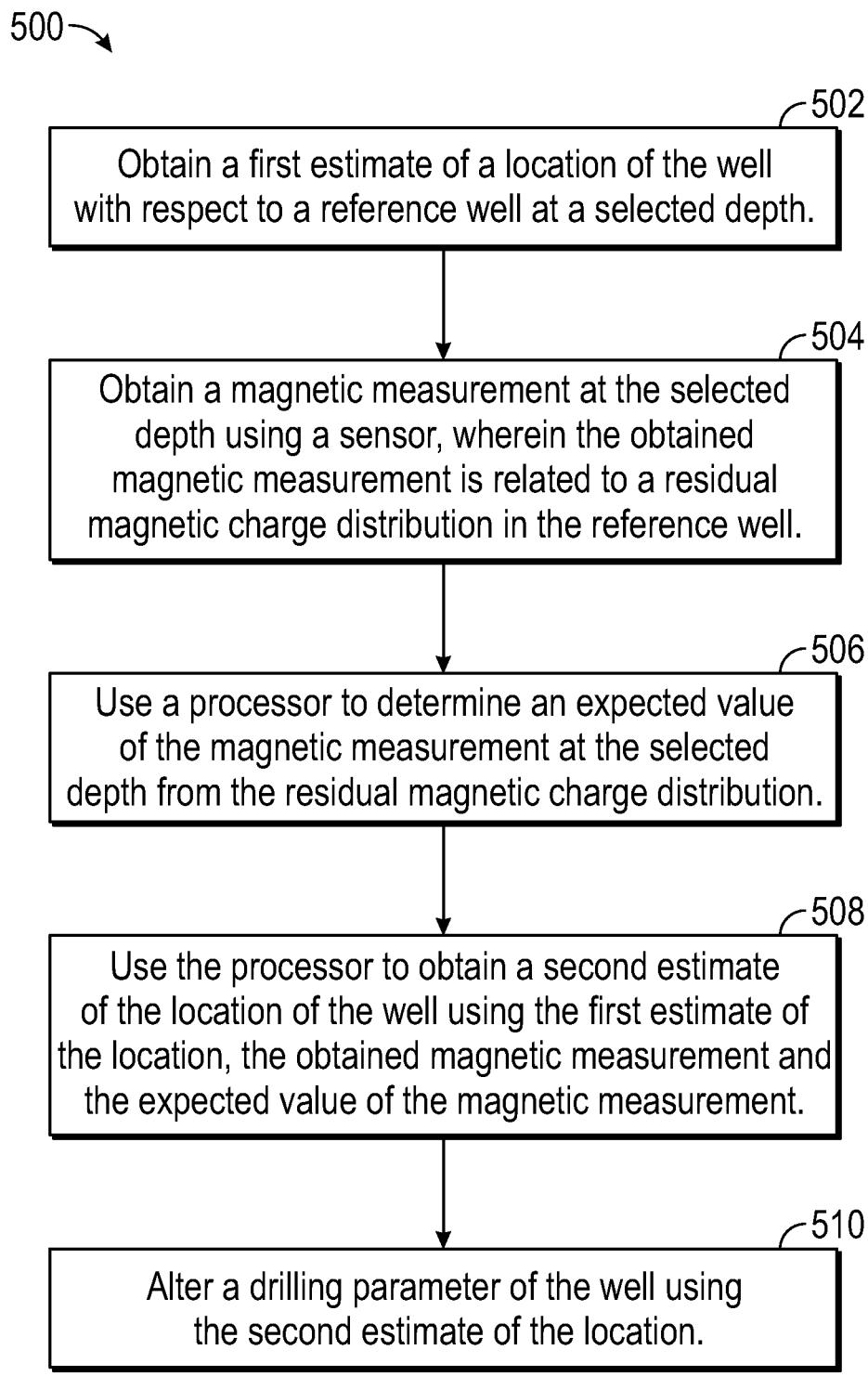
FIG. 5 shows a flowchart illustrating a method of drilling a well in one embodiment of the disclosure.

FIG. 5 shows a flowchart 500 illustrating a method of drilling a well. In block 502, a first estimate is obtained of a location of the well respect to a reference well at a selected depth. In block 504, a sensor obtains a magnetic measurement at the selected depth, wherein the obtained magnetic measurement is related to a residual magnetic charge distribution in the reference well. In block 506, a processor determines an expected value of the magnetic measurement at the selected depth from the residual magnetic charge distribution. In block 508, the processor obtains a second estimate of the location of the well using the first estimate of the location, the obtained magnetic measurement and the expected value of the magnetic measurement. In block 510, a drilling parameter of the well is altered using the second estimate of the location.

While the methods disclosed herein are related to sensor location and orientation for illustrative purposes, the methods may be used to determine location and orientation for the bottomhole assembly, the drill bit and other downhole elements of the drill string.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of drilling a well, comprising:
obtaining a first estimate of a location of the well with respect to a reference well at a selected depth;
obtaining a magnetic measurement at the selected depth using a sensor, wherein the obtained magnetic measurement is related to a residual magnetic charge distribution in the reference well;
determining an expected value of the magnetic measurement at the selected depth from the residual magnetic charge distribution;
obtaining a second estimate of the location of the well using the first estimate of the location, the obtained magnetic measurement, the expected value of the magnetic measurement and a Kalman filter; and
altering a drilling parameter of the well using the second estimate of the location.

2. The method of claim 1, further comprising measuring the residual magnetic charge profile on a casing tubular at an uphole location and tracking the location of the casing tubular when it is disposed in the reference well to determine the residual magnetic charge distribution in the reference well.

3. The method of claim 1, wherein the obtained magnetic measurements further comprises rotationally invariant magnetic field measurements.

4. The method of claim 1, further comprising storing data related to estimating well location in an array having array locations $X_0 \ldots X_N$ corresponding to depths $d_0 \ldots d_N$, respectively.

5. The method of claim 4, further comprising performing a trailing filter to update the estimate of well location at the second to last array location $X_{N-1}$ using the set of measurements stored at the last array location $X_N$ prior to discarding the measurements stored at $X_N$.

6. The method of claim 4, further comprising estimating the well location at the selected depth $d_0$ corresponding to array location $X_0$ using data stored at array location $X_N$ related to previous well depth $d_N$.

7. The method of claim 6, further comprising iteratively determining a well location at array location $X_i$ using data stored in the $X_{i+1}$ array location to obtain the estimation of well location at the selected depth $d_0$.

8. A system for drilling a well proximate a reference well, comprising:
a drill string configured to drill the well;
a sensor disposed on the drill string configured to measure a downhole magnetic field;
a processor configured to:
obtain a first estimate of a location of the well with respect to a reference well at a selected depth of the sensor,
obtain from the sensor a magnetic measurement at the selected depth related to a residual magnetic charge distribution in the reference well, determine an expected value of the magnetic measurement at the selected depth from the residual magnetic charge distribution, obtain a second estimate of the location of the well using the first estimate of the location, the obtained magnetic measurement, the expected value of the magnetic measurement and a Kalman filter, and alter a drilling parameter of the well using the second estimate of the location.

9. The system of claim 8, wherein the residual magnetic charge distribution is determine from a residual magnetic charge profile on a casing tubular determined at an uphole location and a tracking location of the casing tubular in the reference well.

10. The system of claim 8, wherein the obtained magnetic measurements further comprises rotationally invariant magnetic field measurements.

11. The system of claim 8, wherein the processor is further configured to store data related to estimating well location in an array having array locations $X_0 \ldots X_N$ corresponding to depths $d_0 \ldots d_N$, respectively.

12. The system of claim 11, wherein the processor is further configured to perform a trailing filter to update the estimate of well location at the second to last array location $X_{N-1}$ using the set of measurements stored at the last array location $X_N$ prior to discarding the measurements stored at $X_N$.

13. The system of claim 11, wherein the processor is further configured to estimate the well location at the selected depth $d_0$ corresponding to array location $X_0$ using data stored at array location $X_N$ related to previous well depth $d_N$.

14. The system of claim 13, wherein the processor is further configured to iteratively determine a well location at array location $X_i$ using data stored in the $X_{i+1}$ array location to obtain the estimation of well location at the selected depth $d_0$.

15. A computer readable medium having stored thereon instructions that when read by at least one processor enable the at least one processor to perform a method of drilling a well, the method comprising:

obtaining a magnetic measurement from a sensor at a selected depth, wherein the obtained magnetic measurement is related to a residual magnetic charge distribution in the reference well, determining an expected value of the magnetic measurement at the selected depth from the residual magnetic charge distribution, obtaining a second estimate of the location of the well using the first estimate of the location, the obtained magnetic measurement, the expected value of the magnetic measurement and a Kalman filter; and altering a drilling parameter of the well using the second estimate of the location.

16. The computer readable medium of claim 15, wherein the method further comprises storing data related to estimating well location in an array having array locations $X_0 \ldots X_N$ corresponding to depths $d_0 \ldots d_N$, respectively.

17. The computer readable medium of claim 16, further comprising estimating the well location at the selected depth $d_0$ corresponding to array location $X_0$ using data stored at array location $X_N$ related to previous well depth $d_N$ by iteratively determining a well location at array location $X_i$ using data stored in the $X_{i+1}$ array location.

18. The computer readable medium of claim 16, further comprising performing a trailing filter to update the estimate of well location at the second to last array location $X_{N-1}$ using the set of measurements stored at the last array location $X_N$ prior to discarding the measurements stored at $X_N$.

* * * * *